W. A. ZIMPFER.
CORN HARVESTER.
APPLICATION FILED MAR. 2, 1918.
1,344,017.
Patented June 22, 1920.
4 SHEETS—SHEET 4.
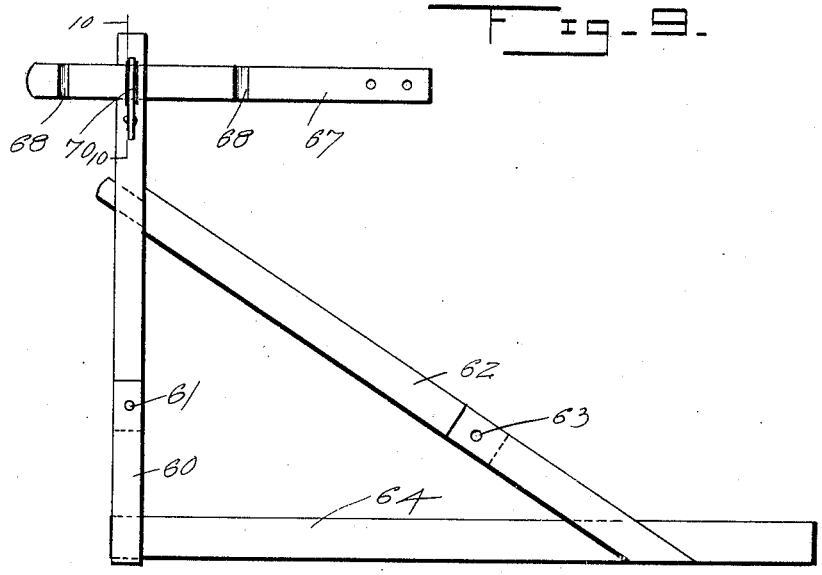
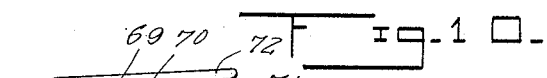
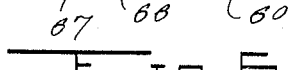
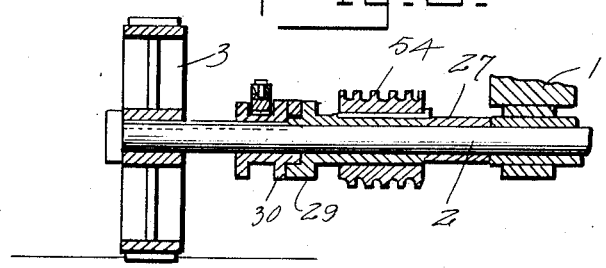
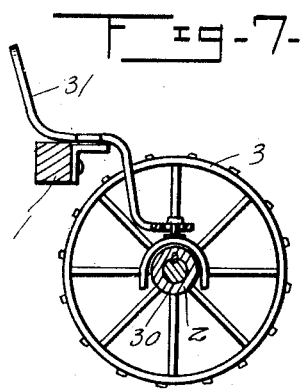
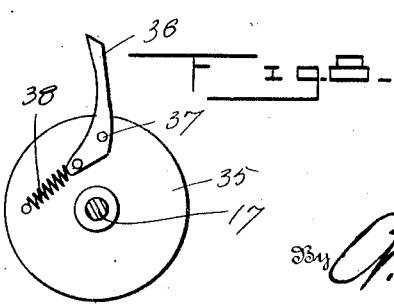
Witnesses
Inventor
W. A. Zimpfer
By
Attorney

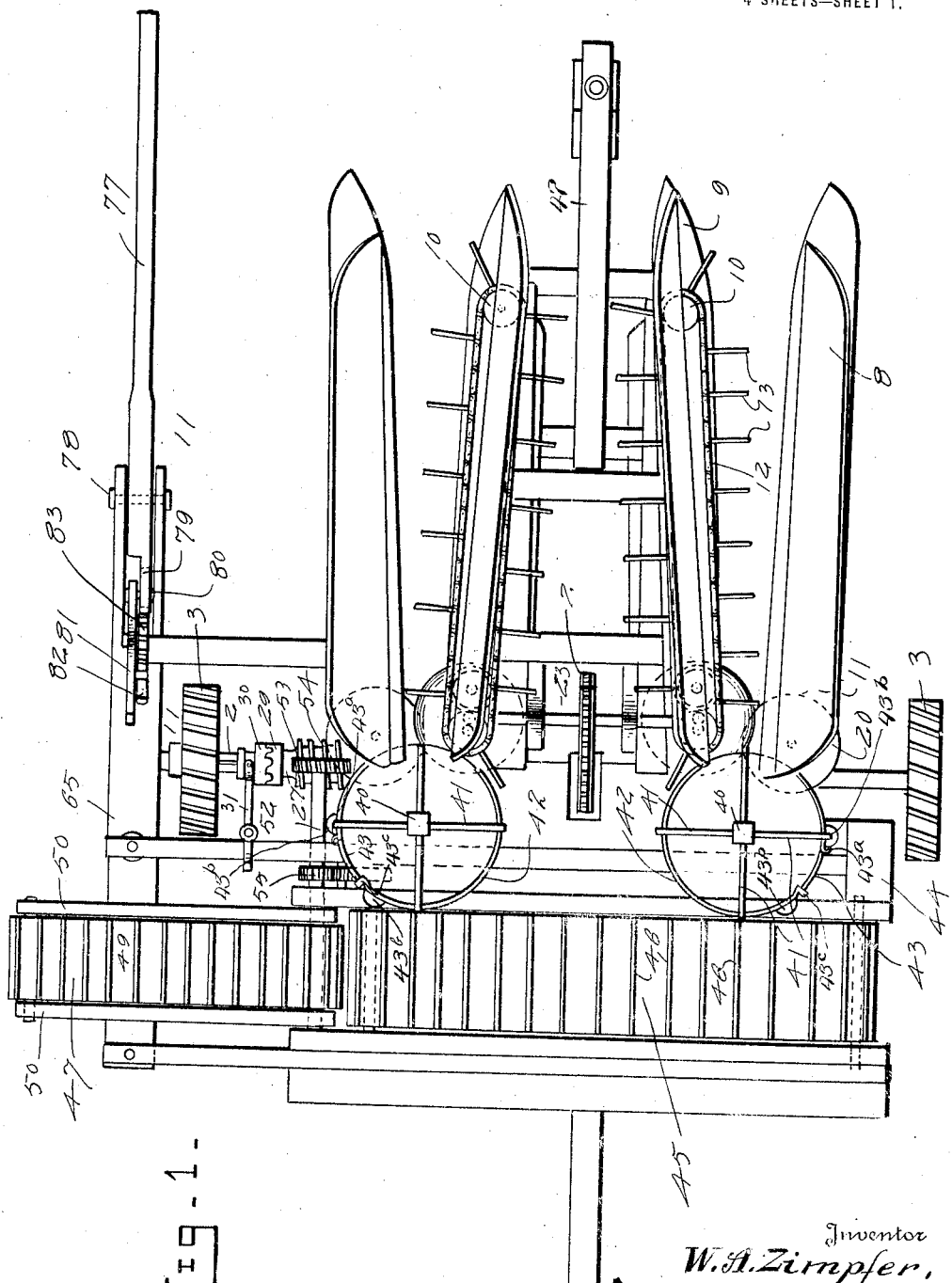

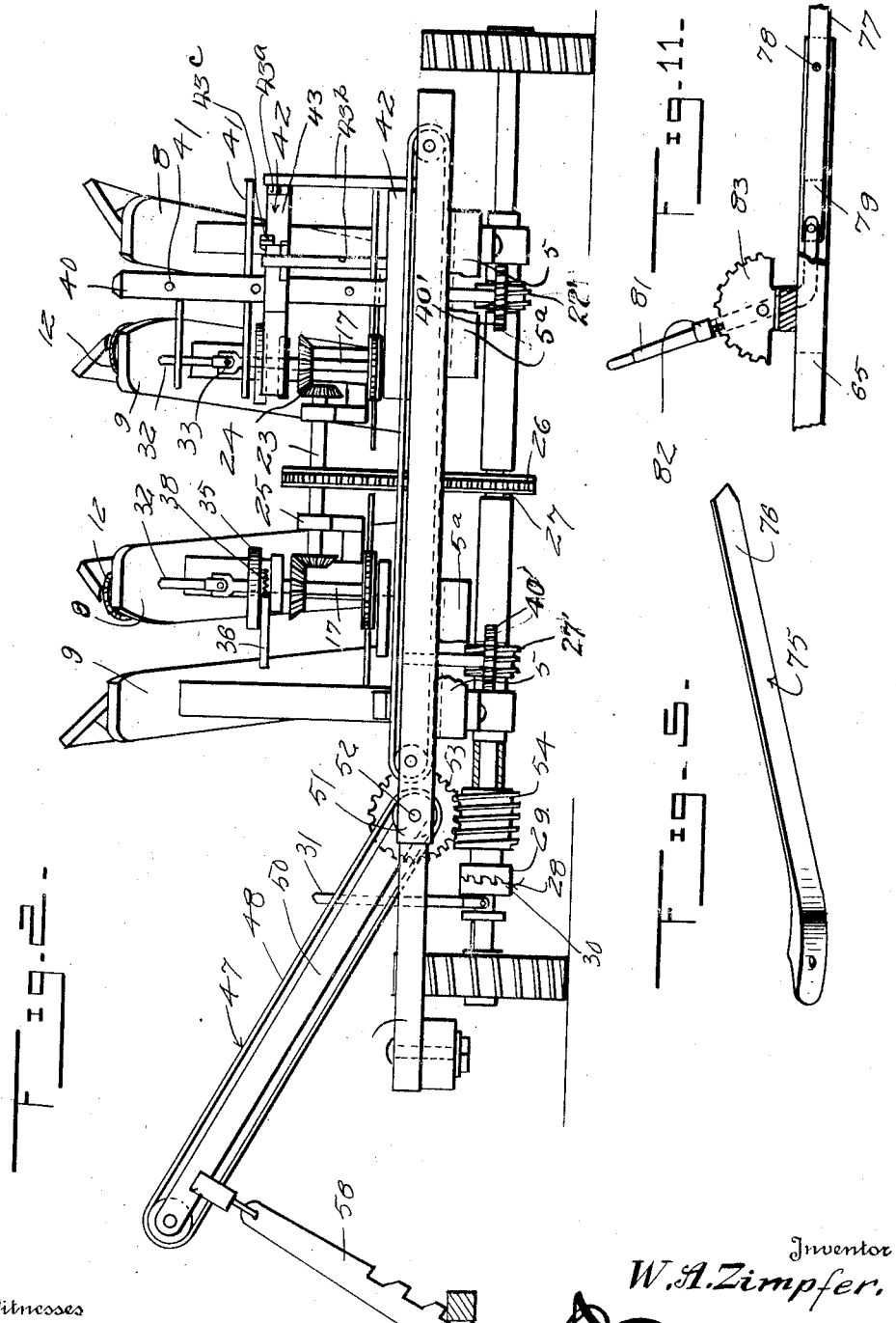

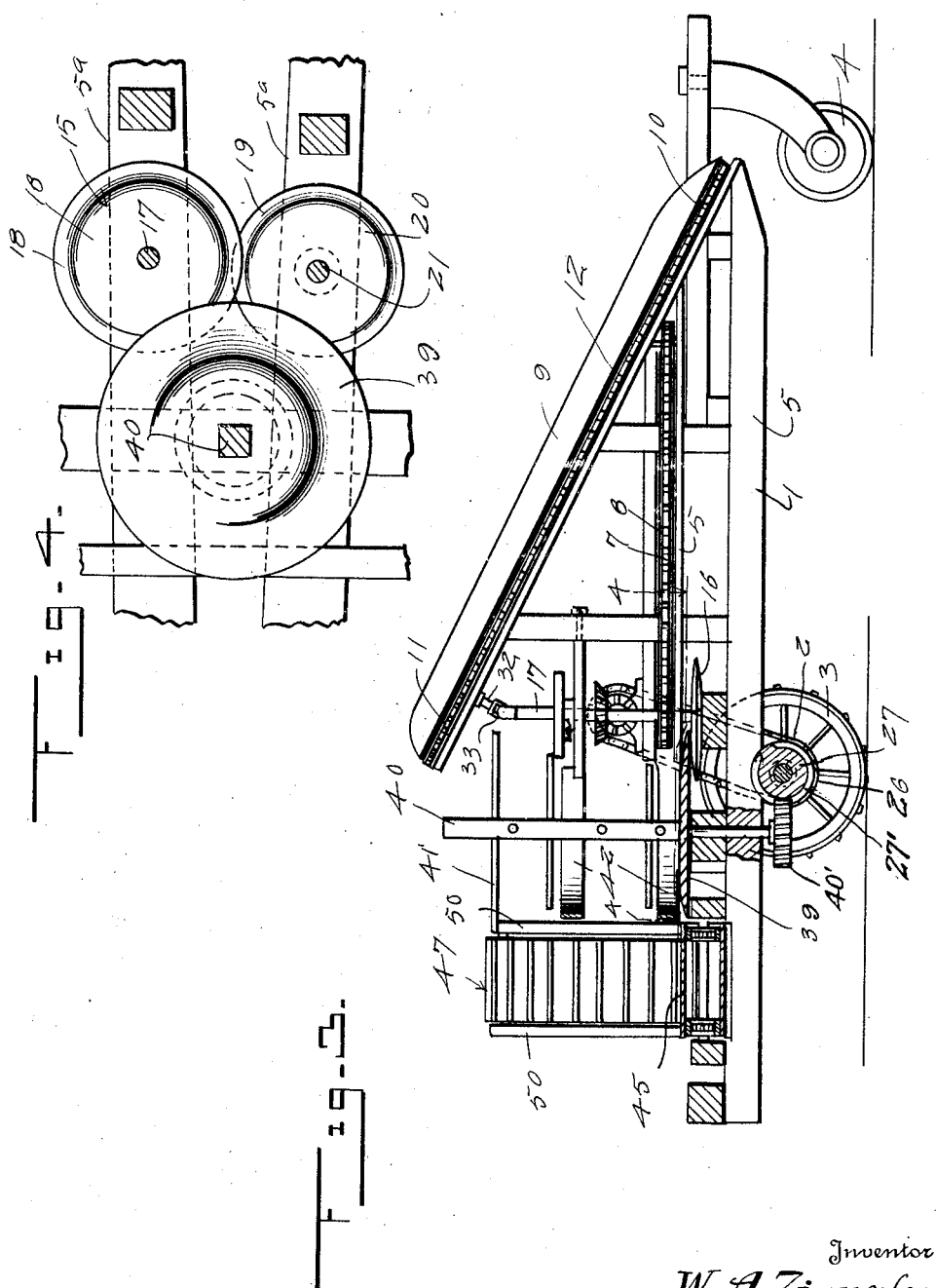

UNITED STATES PATENT OFFICE.

WILLIAM A. ZIMPFER, OF JACKSON CENTER, OHIO.

CORN-HARVESTER.

1,344,017.	Specification of Letters Patent.	Patented June 22, 1920.

Application filed March 2, 1918. Serial No. 220,092.

*To all whom it may concern:*

Be it known that I, WILLIAM A. ZIMPFER, a citizen of the United States, residing at Jackson Center, in the county of Shelby and State of Ohio, have invented certain new and useful Improvements in Corn-Harvesters; and I do hereby declare the following to be a full, clear, and exact description of the invention, such as will enable others skilled in the art to which it appertains to make and use the same.

This invention relates to a corn harvester and the primary object of the invention is to provide a corn harvesting machine which will cut two rows of standing corn upon each trip across the field and deliver the cut corn stalks to a carrier structure which supports these corn stalks in vertical position so that an operator may remove the stalks from the carrier, when necessary and desired and stand them upright in shock formation, and further to provide a carrier or conveyer structure and an elevator structure for receiving the corn stalks from the conveyer structure to deliver them upon a wagon or similar structure for transportation to a silo, when it is desired to cut the corn into ensilage.

A more specific object of this invention is to provide a corn cutter as specified which includes a pair of disk cutters which have their peripheries sharpened, and one of which is positively rotated, by the traction of the harvester while the other is rotated only by the engagement therewith of a corn stalk and these two sharpened disks coact to cleanly cut or sever the corn stalks from the roots, delivering the cut stalks upon a third disk positioned rearwardly of the first mentioned disks, and between the rotating arms of an upright carrier structure which supports the corn stalks in vertical position, and forces them within the circular supporting structure composed of a plurality of metal bands, until the operator desires to remove the stalks for placing them in shock position, at which time he opens a door formed in the circular retaining structure of the carrier.

A further object of this invention is to provide means for yieldably engaging the upper portions of the corn stalks for facilitating in forcing the stalks against the rotary knives so as to insure the proper cutting of the stalks and also insure the passage of the stalks upon the disk to the vertical carrier structure.

A further object of this invention is to provide a coupling structure for connecting a wagon to the improved corn harvester which structure may be operated, to alter the position of the wagon with respect to the elevator of the harvester, so that both the front and the rear end of the wagon may be properly filled or loaded with the cut corn stalks.

With the foregoing and other objects in view this invention consists in such novel features of construction, combination and arrangement of parts as will be hereinafter more fully described illustrated in the accompanying drawings and claimed.

In describing the invention in detail, reference will be had to the accompanying drawings wherein like characters designate like and corresponding parts throughout the several views and in which:

Figure 1 is a top plan of the improved corn harvester.

Fig. 2 is a rear elevation of the corn harvester certain portions being omitted for the sake of clearness in illustration.

Fig. 3 is a longitudinal section through the harvester.

Fig. 4 is a horizontal section on the line 4—4 of Fig. 3.

Fig. 5 is a detail perspective view of a resilient member attached to the corn guides for engaging the stalks to insure their proper guiding to the cutting knives.

Fig. 6 is a sectional view through a part of the operating mechanism of the harvester.

Fig. 7 is a vertical section taken transversely through the section illustrated in Fig. 6, and showing a part of the operating mechanism.

Fig. 8 is a detail view of the yieldable member for forcing the corn stalks against the knives and upon the vertical or upright carrier structure.

Fig. 9 is a plan view of the improved coupling employed for connecting a wagon to the harvester.

Fig. 10 is a section on the line 10—10 of Fig. 9, and

Fig. 11 is a section on the line 11—11 of Fig. 1.

Referring more particularly to the drawings, 1 designates the main supporting frame of the corn harvester, which supporting frame is supported by a rear axle 2 upon which the usual type of supporting wheels 3 are mounted, and by a front swivelly mounted supporting wheel 4.

The supporting frame 1 carries two sets of harvesting or cutting mechanisms, and in the following description only one will be described, as each of them are identical.

The corn harvesting mechanism includes a pair of horizontal stalk guiding members 5 and 5$^a$, which converge as they extend rearwardly and are adapted to pass one upon each side of a row of standing corn. The inner bar 5$^a$ has a pair of sprockets supported above the same, about which a sprocket chain 6 travels. The sprocket chain 6 has a plurality of outwardly extending tines or fingers 7 carried thereby which engage the corn stalks and support them and force them rearwardly during the travel of the harvester. A pair of inclined guiding boards 8 and 9 are positioned above the guides 5 and 5$^a$ and are supported thereby at their forward ends. Sprockets 10 and 11 are carried by the inclined guides 9 and a sprocket chain 12 passes about the sprocket. The sprocket chain 12 has tines or fingers 13 carried thereby which also engage the corn stalks during the travel of the machine. The corn stalks are guided by the guides 5, 5$^a$ and 8 and 9 and the chains 6 and 12 to the cutting mechanism generically indicated by the numeral 15. The cutting mechanism 15 includes a horizontally positioned disk 16 which is mounted upon a shaft 17 and has its periphery beveled as indicated at 18 to form a cutting edge which coacts with the cutting edge 19 of a second disk 20 which is mounted upon a shaft 21. The edges of the disks 16 and 20 overlap, substantially equi-distant of the guiding members so that they will properly cut or sever the corn stalks.

The shaft 21 is rigidly supported by the supporting structure of the harvester, while the shaft 17 is rotatably supported by the harvester. The vertical shaft 17 is rotated from a shaft 23 by suitable miter gears 24. The shaft 23 is supported by suitable bearings 25, and it is connected to the sleeve 27 by a sprocket and chain connection 26. Sleeve 27, with which the shaft 23 is operatively connected by the sprocket and chain connection 26, is rotated from the axle 2 through the medium of a clutch structure generically indicated by the numeral 28 which clutch structure comprises a section 29 carried by the sleeve 27 and a clutch section 30 which is carried by and feathered upon the axle 2. A hand lever 31 is provided for shifting the clutch section 30 into or out of engagement with the clutch section 29 to control the rotation of the sleeve 27 and consequently the rotation of the shaft 23.

The shaft 32, upon which the sprocket 11 is mounted is connected by a universal connection 33 to the shaft 17, for operating the chain 12 by the rotation of the shaft 17.

A disk 35 is mounted upon the shaft 17 above the cutting disk 16, and it has an arm 36 pivotally connected thereto as shown at 37, to which arm is connected a spiral spring 38. The arm 36 is adapted to yieldably engage the corn stalks after they have been cut by the cutting disks 16 and 20 and force them upon the carrying disk 39 which is mounted in the rear of the cutting disks 16 and 20, directly above these cutting disks and overlapping the same as clearly shown in Fig. 4 of the drawings. The disk 39 is carried by a rectangular shaft 40 which shaft is rotatably mounted as shown in Fig. 3 and carries a gear 40′ engaged by the worm 27′ carried by the sleeve 27 for transmitting rotary movement from the sleeve to the shaft 40 through the medium of the gear 40′. The shaft 40 has a plurality of radiating arms 41 attached thereto in vertical spaced relation, which engage the corn stalks and carry them about within the upright carrier structure which includes the disk 39, shaft 40, arms 41 and circular metal bands 42. The uppermost circular band 42 is carried by standards 43$^b$ and is provided with a door section 43 which is hingedly mounted as shown at 43$^a$ and has its free end releasably secured by a catch 43$^c$ thus releasably retaining the door in a closed position. This permits the operator who may stand upon the platform 44 to open this door section and remove the corn stalks from the carrier structure, to set them in shock formation upon the field over which the harvester is traveling or to place the stalks cross wise upon a conveyer structure 45 which extends transversely across the rear end of the harvester. The conveyer structure 45 includes an ordinary endless apron or belt having suitable flights 46 which engage the stalks and carry them along with the upper run of the conveyer. The conveyer 45 delivers the corn stalks to an elevator structure 47 which comprises an endless apron 48 having flights 49 carried thereby, and suitable supporting members 50 which are pivotally connected to the supporting structure of the harvester so as to allow the inclination of the elevator structure 47 to be varied as necessary.

The guiding roller 51 about which the lower end of the elevator 47 travels is mounted upon a shaft 52 which shaft has a worm gear 53 mounted thereon that meshes with a worm 54 which is keyed upon the sleeve 27. The conveyer structure 45 is rotated upon the shaft 52 by a suitable power transmitting mechanism indicated at 55 which may comprise a train of gears or a sprocket and chain connection as desired.

When the corn stalks are placed upon the conveyer 45 they are elevated by the elevator structure 47 for deposit into a wagon or analogous structure, and a suitable brace structure 56 is provided for supporting the elevator structure 47 at the desired angle. When a wagon or similar device is used for receiving the corn stalks from the elevator structure 47, the coupling mechanism or structure illustrated in Figs. 9 and 10 is employed and this structure comprises a transversely extending brace 60 which is composed of two sections connected by a pin as indicated at 61, and a brace 62 which is also composed of two sections connected by a pin as indicated at 63.

The transversely extending bar 60 and the brace 62 may be connected to a bar 64, which may in turn be attached to the side supporting bars 65 of the supporting frame 1 or if it is so desired, the brace 62 and the transversely extending bar 60 may be connected directly to the side bar 65. The transversely extending bar 60 is provided with a recess 66 formed near its outer end through which a coupling pole 67 extends. The coupling pole 67 is adapted to be connected to a wagon (not shown), and it is provided with recesses 68 formed in its upper surface which receive the depending lug 69 formed upon a pivoted lock or latch 70. The lock or latch 70 is pivotally carried by the bar 60, and it has a spring 71 positioned beneath the same and engaging the under surface of the end of the latch opposite of the pivot from the lug 69 for holding the lug 69 in one of the recesses 68 to regulate the connection between the harvester and the wagon. Any suitable means may be connected to the end 72 of the locking or latch lever 70 for operating the same, to move the lug 69 out of the recess 68, in which it has been seated so as to allow the corn harvester to move a limited distance independently of movement of the wagon or to allow the corn harvester to move independently of movement of the wagon until the lug 69 moves into alinement with the recess 68 formed in the coupling pole 67 next to the one in which it has been previously seated at which time the spring 71 will force the lug 69 into the recess 68 and rigidly connect the coupling pole 67 to the bar 60 and consequently rigidly connect the wagon to the corn harvester. By this construction, the fodder or corn stalks may be fed first to one end of the wagon and then to the other end of the wagon.

Resilient members 75 are attached to the members 5 and 5ª between their facing surfaces and they comprise relatively long flat blades 76 which bow outwardly from the facing surfaces of the bars 5, to frictionally grip the corn stalks, and insure their proper guiding to the cutting disks 16 and 20.

The tongue 77 of the harvester is positioned at one side of the same and it is pivotally connected as shown at 78 to the side bar 65. The rear end of the tongue, rearwardly of the pivot 78 is reduced in thickness, and is provided with a slot 79 through which a pin 80 extends. The pin 80 connects the reduced end of the tongue 77 to a pivotally mounted hand lever 81 which carries a dog mechanism 82 that coacts with a quadrant 83 for holding the lever in various adjusted positions.

The lever 82 is provided for pivotally moving the tongue to vary the elevation of the same, as may be necessary under different conditions contingent with the harvesting of the corn.

Summing up, generically, the operation of the improved corn harvester is as follows: The standing stalks of corn are guided between the guides 5, 5ª and 8 and 9 by the chains and the fingers carried thereby to the cutting disks 16 and 20 where the rotation of the cutting disk 16 will force the stalks against the edge of the disk 20 and this cutting edge together with the cutting edge 18 of the disk 16 will cut or sever the corn stalks from the root and the stalks will be moved rearwardly upon the disk 39 by the arm 36 which arm will spring back into its normal position after it has forced a stalk of corn upon the disk 39 between two adjacent sets of the arms 41. The arms 41 will hold the corn upright and the rotation of the standards 40 will move the different portions between the adjacent sets of the arms 41 into corn stalk receiving position. When the desired number of stalks have accumulated within the carrier structure the operator turns the door section 43 so as to remove the corn stalks from the vertical carrier. He can either stand the stalks in shock formation upon the field over which the harvester is traveling or he can place them cross wise upon the conveyer 45 for delivery to the elevator 47, which in turn delivers them to a wagon by means of which they may be hauled to any suitable storage place, or to a cutter for making silage thereof.

From the foregoing description taken in connection with the accompanying drawings the advantages of construction and the method of operation of the improved corn harvester will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

1. In a corn harvester, a horizontally disposed disk, stalk retaining bands mounted concentric with said disk in superposed spaced relation, and means for harvesting stalks of corn and conveying them to said disk in upright position, the upper one of said bands being provided with a section mounted for movement about a vertical axis whereby the section may be swung into and out of its normal position.

2. In a corn harvester, a horizontally disposed disk, a lower stalk retaining band and an upper stalk retaining band mounted concentric with said disk in superposed spaced relation, said lower band being positioned adjacent the upper face of the disk, means for harvesting stalks of corn and conveying them to said disk in upright position, and a horizontal conveyer positioned with its upper run in rear of, and closely adjacent to and substantially in the plane of said disk, said upper band being provided in its rearward portion with a section pivoted for movement about a vertical axis whereby the pivoted section may be swung into and out of its normal position.

3. In a corn harvester, cutting disks, means for engaging corn stalks and guiding the same into engagement with said disks so as to be cut thereby, stalk receiving and retaining means in rear of the disks, a rotary disk mounted above one of said cutting disks, an arm rockably mounted on said disk and adapted to engage the cut stalks so as to force the same rearwardly into said receiving and retaining means when the disk is rotated, and resilient means for normally holding said arm in predetermined relation to the disk.

4. In a corn harvester, the combination, of corn guiding means, stalk cutting means, a carrier structure positioned for receiving cut stalks from said cutting means, said carrier structure including a vertical bar, a disk carried by said bar, a plurality of radiating arms carried by said bar for engaging the corn stalks and holding them in upright position, and a plurality of metal bars surrounding said carrier structure for preventing corn stalks from falling out of the same, one of said bars being provided with a section hingedly mounted for swinging movement into and out of its normal position, and a yieldably mounted arm positioned for engaging the corn and forcing it from said cutting means into said carrier structure.

In testimony whereof I affix my signature in presence of two witnesses.

WILLIAM A. ZIMPFER.

Witnesses:
 CARL G. CLAYTON,
 CHAS. M. LAMBERT.